May 8, 1928.
T. H. LASHLEY ET AL
1,668,851
AGRICULTURAL IMPLEMENT
Filed Oct. 6, 1926
3 Sheets-Sheet 1
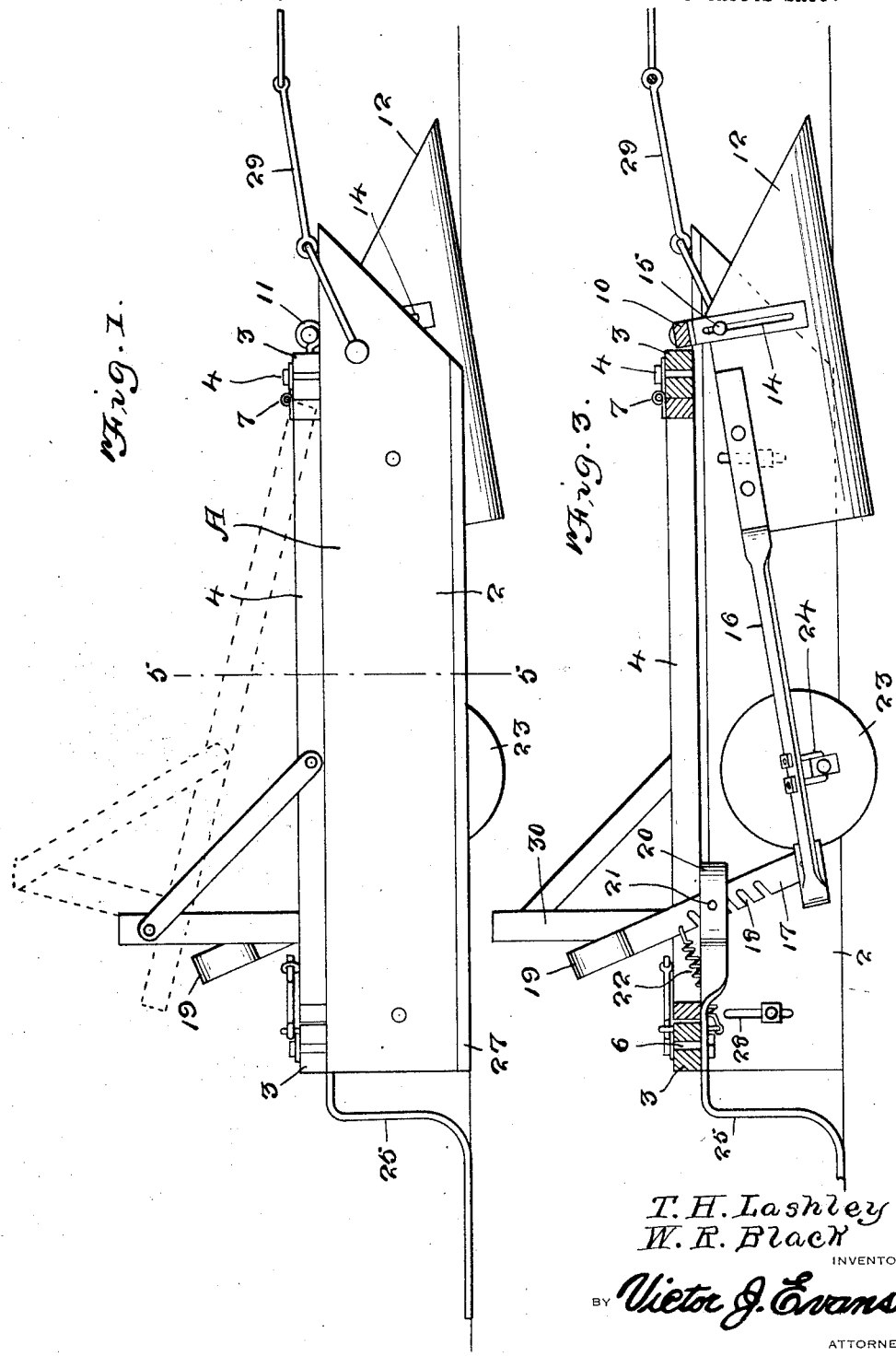
T. H. Lashley
W. R. Black
INVENTOR
BY *Victor J. Evans*
ATTORNEY

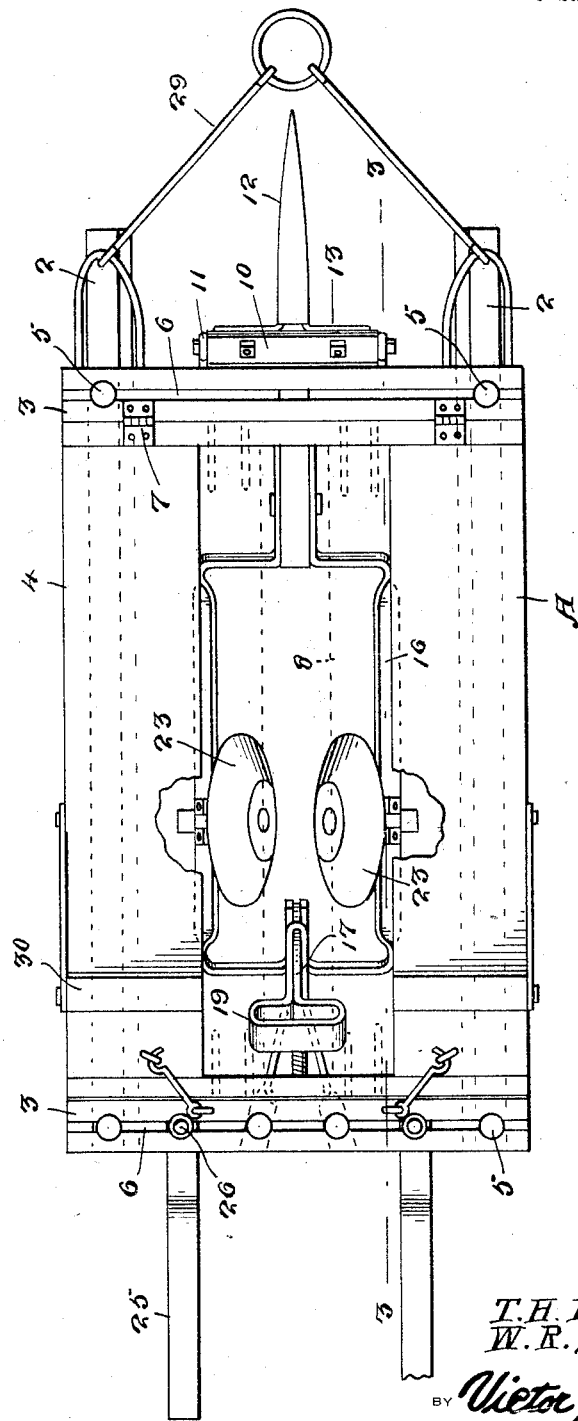

May 8, 1928.  1,668,851
T. H. LASHLEY ET AL
AGRICULTURAL IMPLEMENT
Filed Oct. 6, 1926   3 Sheets-Sheet 3
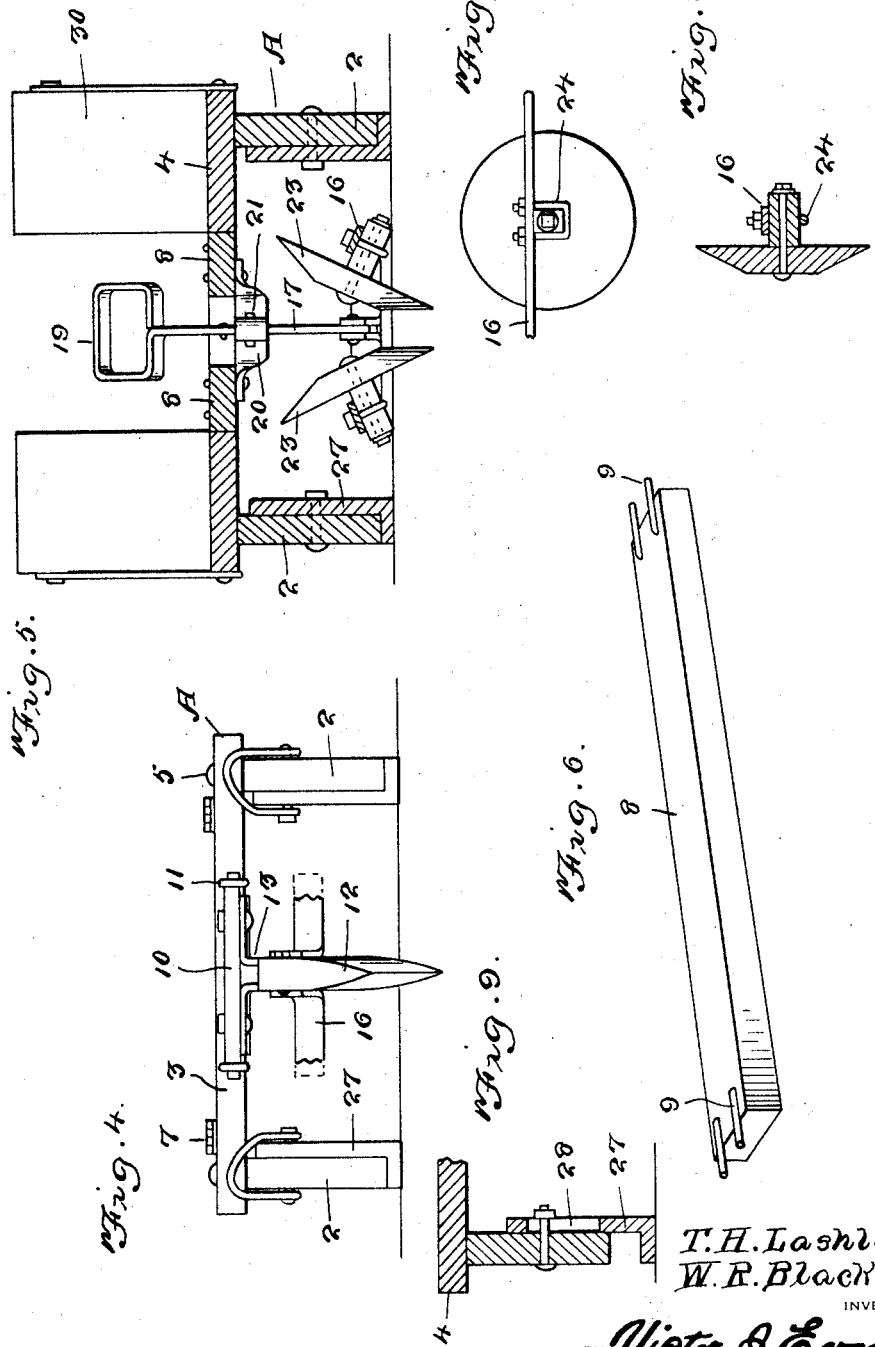
T.H.Lashley
W.R.Black
INVENTOR
BY *Victor J. Evans*
ATTORNEY Patented May 8, 1928.

1,668,851

UNITED STATES PATENT OFFICE.

THOMAS H. LASHLEY AND WILLIAM R. BLACK, OF HASKELL, OKLAHOMA, ASSIGNORS OF ONE-THIRD TO C. A. OVERSTREET, OF MUSKOGEE, OKLAHOMA.

AGRICULTURAL IMPLEMENT.

Application filed October 6, 1926. Serial No. 139,917.

This invention relates to an agricultural implement, the general object of the invention being to provide means for facilitating the planting of onion sets and the like and various kinds of seeds by providing a furrow opener and furrow closer, the plants or seeds being dropped into the furrow by a person sitting on the device in front of the furrow closers.

Another object of the invention is to provide means for adjusting the parts so that the furrow can be made of the desired depth.

A further object of the invention is to provide means for adjusting the height of the device from the ground so as to raise the furrow means out of contact with the ground.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:

Figure 1 is a side elevation of the device.

Figure 2 is a plan view thereof.

Figure 3 is a section on line 3—3 of Figure 2.

Figure 4 is a front end view.

Figure 5 is a section on line 5—5 of Figure 1.

Figure 6 is a perspective view of one of the removable bars for the platform.

Figure 7 is a view showing the means for holding the spindle of one of the furrow closing disks in place.

Figure 8 is a sectional view through Figure 7.

Figure 9 is a detail sectional view showing the means for increasing the height of the device.

In these views, A indicates a sled which consists of the side pieces or runners 2, the cross pieces 3 and the platform 4. The side pieces or runners are adjustably connected with the cross pieces through means of the bolts 5 engaging the slots 6 formed in the cross pieces so that the runners can be moved toward and away from each other. The platform 4 is hingedly connected at its front end to the front end of the front cross piece, as shown at 7, so that said platform can be raised to permit access to the parts beneath the same. A pair of removable bars 8 form the central part of the platform, the bars being spaced apart to leave an opening in the center of the platform and they have pins 9 at their ends for resting upon the cross pieces of the platform. A bar 10 is supported for rocking movement at the front end of the sled by having its trunnions held by the eye bolts 11 and a furrow opener or plow 12 is fastened to the bar by means of the angle straps 13, each strap having a slot 14 therein for receiving a bolt 15 so that the plow can be adjusted vertically between the straps. A yoke-shaped frame 16 has its front end fastened to the plow and its rear end is pivoted to an upright lever 17 which is provided with the notches 18 and the handle 19. This lever extends between the bars 20 which carry a pin 21 adapted to engage any one of the notches, a spring 22 tending to hold the notches in engagement with the pin. By this arrangement, the frame 16, with the plow and the covering disks 23, can be adjusted vertically so that furrows of different depths can be formed. The disks are arranged one on each side of the yoke-shaped frame and are beveled to close the furrow formed by the plow. These disks are adjustable toward and away from each other by having their spindles or hubs held by the U bolts 24 carried by the frame 16.

Spring bars 25, of substantially Z-shape, are adjustably connected with the rear of the sled by the bolts 26 which pass through the slot 6 in the rear cross piece 3, these bars preventing the rear of the sled from sinking into the ground.

Each runner is provided with an L-shaped member 27 which is adjustably connected with the runner by the slot and bolt connection, shown generally at 28, so that the short arm of each member can be adjusted toward and from the lower edge of the runner and thus permit the height of the sled to be adjusted. The short arms of the member 27 act to take the wear of the runners. The draft means are attached to the parts 29 at the front end of the sled. Uprights 30 are fastened to the platform.

From the foregoing, it will be seen that we have provided simple means whereby a furrow may be opened so that onion sets or the like and various kinds of seeds can be dropped into the same by a person sitting on the device and then the furrow covered after the seeds or sets have been placed therein. The device can be adjusted both vertically and transversely and the covering disks can be adjusted toward and away from each other, as desired.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A sled of the class described comprising a pair of runners, a pair of front and rear cross pieces, means for adjustably connecting the runners thereto, a platform hinged to the inner member of the front pair of cross pieces and resting upon the runners and latch means for connecting the rear of the platform with the rear cross piece.

2. A planting apparatus comprising a sled, a horizontal bar at the front thereof pivoted for rocking movement, depending brackets carried by the bar having slots therein, a plow, bolts carried by the plow and passing through the slots in the brackets for adjustably connecting the plow with the brackets, a yoke-shaped frame fastened to the plow, covering means adjustably connected with the frame and a hand lever connected with the lower end of the frame for raising and lowering the same.

In testimony whereof we affix our signatures.

THOMAS H. LASHLEY.
WILLIAM R. BLACK.